Nov. 8, 1966   L. W. HALPIN ETAL   3,283,576
MEANS FOR DETECTING CHANGE OF HEAT TRANSFER RATE
Filed Oct. 7, 1963   3 Sheets-Sheet 1

INVENTORS.
LAWRENCE WAYNE HALPIN
EUGENE B. SEELEY
BY
Reynolds & Christensen
ATTORNEYS

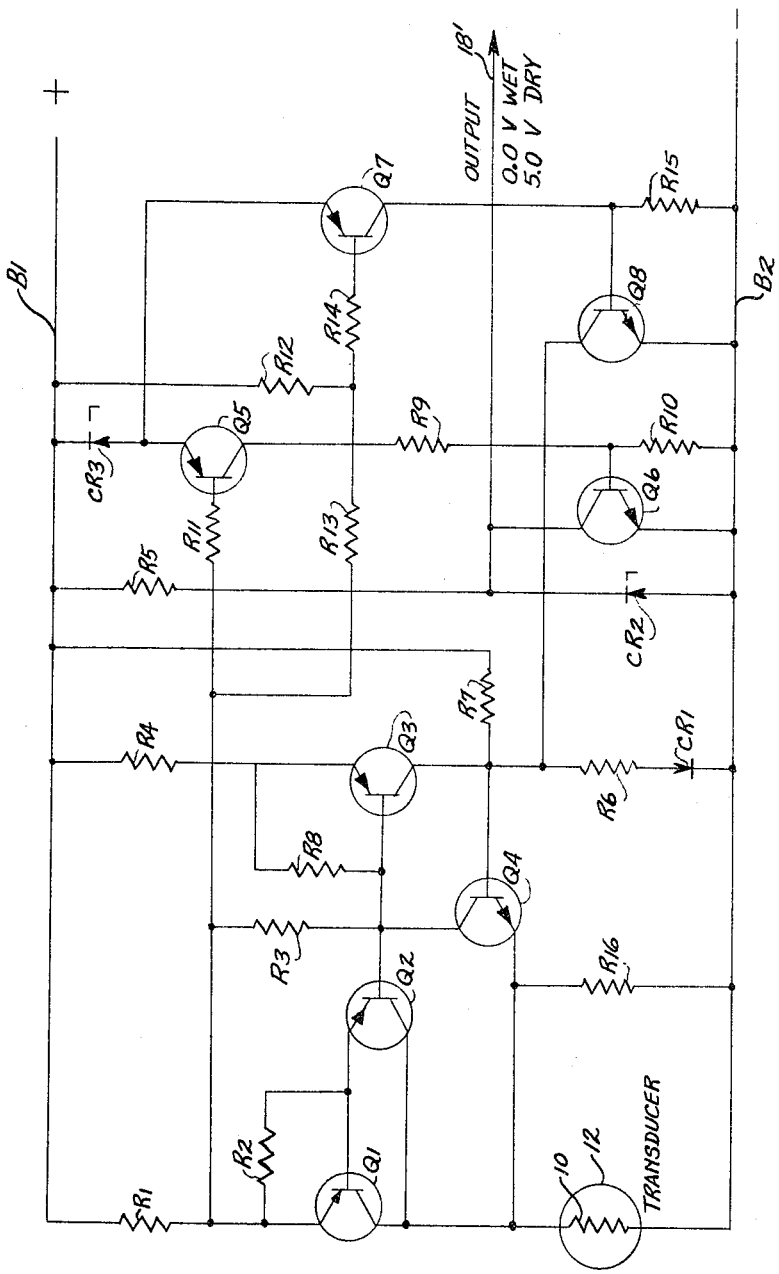

Nov. 8, 1966  L. W. HALPIN ETAL  3,283,576
MEANS FOR DETECTING CHANGE OF HEAT TRANSFER RATE
Filed Oct. 7, 1963  3 Sheets-Sheet 3

INVENTORS.
LAWRENCE WAYNE HALPIN
EUGENE B. SEELEY
BY
Reynolds & Christensen
ATTORNEYS

United States Patent Office 3,283,576
Patented Nov. 8, 1966

---

3,283,576
MEANS FOR DETECTING CHANGE OF HEAT TRANSFER RATE
Lawrence Wayne Halpin, Seattle, and Eugene B. Seeley, Bellevue, Wash., assignors to United Control Corporation, Redmond, Wash., a corporation of Washington
Filed Oct. 7, 1963, Ser. No. 314,220
10 Claims. (Cl. 73—295)

This invention relates to devices for measuring heat transfer rate and for change of heat transfer rate to or from a temperature sensitive element caused by its environment. The invention is herein illustratively described by reference to its application for detecting a change of level of cryogenic liquid; however, it will be recognized that certain modifications and changes therein with respect to details may be made and that various other uses and applications thereof may be employed without departing from the essential features involved.

The primary object of this invention is to provide a detector or sensor of the described nature which will respond instantly and reliably to a change of heat transfer rate measurably altering the temperature of its transducer or sensing element, either during an increase or during a decrease of heat transfer rate. A further object is to provide detector apparatus which may be designed to operate at any of widely different levels of temperature and/or heat transfer rates, and specifically at the very low temperatures usually encountered in cryogenic liquids such as liquid hydrogen. A further object is to achieve the result with relatively simple and inexpensive equipment employing relatively few components.

A further object is to provide detector apparatus of the heated resistance element type having a very low power requirement and lending itself to manufacture in small and lightweight forms for portable and remote control applications where desired.

Still another object is to provide a detector which may be used safely with its sensing element in a combustible medium. To this end the detector makes use of low power levels and open-circuit voltage limiting and short-circuit current limiting provisions. Further, it is a purpose herein to provide such a sensing device which is self-protecting, which cannot destroy itself or its temperature sensitive element although exposed unattended for long periods of time to the most extreme conditions which may be expected.

As herein disclosed an electrical resistance sensor or transducer of temperature sensitive material (i.e. which undergoes a marked change of resistance as a function of temperature) placed in the operating environment is heated to the desired initial operating point by passing current of a controlled magnitude through the element. Since the temperature and thereby the resistance of the sensing element are determined by the combined effects of heat transfer rate and the power applied to the element, a change of heat transfer rate with no change in applied power results in a change of sensing element temperature. At the initial operating point the sensing element has a particular value of temperature and a related electrical resistance. For sensitive detection, the detection point differs only slightly from the initial operating point, that is the change of transducer temperature necessary for detecting a change of heat transfer rate is slight. This temperature change is sensed by detecting the corresponding change of resistance of the transducer. Transducer resistance is defined as the ratio of transducer voltage to transducer current. While this ratio, as such may be produced or represented directly as a voltage or current value by a suitable dividing circuit, it is preferred, according to a feature of this invention, to relate transducer current magnitude to transducer voltage magnitude for application of both, either as voltage signals or as current signals, to a normally balanced differential output circuit. The latter's output, proportional to the algebraic difference of these related signal values, is applied for control purposes to the source of heating current in a regulatory feedback loop by which to maintain the resistance value of the sensing element substantially constant. This it does by compensatively increasing or decreasing the sensing element heating current in accordance with a decrease or increase of heat transfer rate affecting the sensing element. The power applied to the element becomes a measure of heat transfer rate.

Thus, in the illustrated application a change of liquid level which either immerses the sensing element in the liquid phase of the cryogenic, for example, or which exposes it to the gaseous phase thereof is instantly detectable by the abrupt heating current (power) change necessary to maintain the resistance value constant. Output response of the circuit is developed from this change of heating power and may be used to operate an alarm, actuate an indicator or produce some other result when the liquid level passes by a certain point. Such output response, therefore, does not depend upon, nor is it delayed by, the necessity for heating or cooling the resistance element to an ultimate new temperature.

These and other features, objects and advantages of the invention will become more fully evident from the following description by reference to the accompanying drawings.

FIGURE 4 is a schematic circuit diagram of a preferred embodiment incorporating certain refinements.

Figure 1:
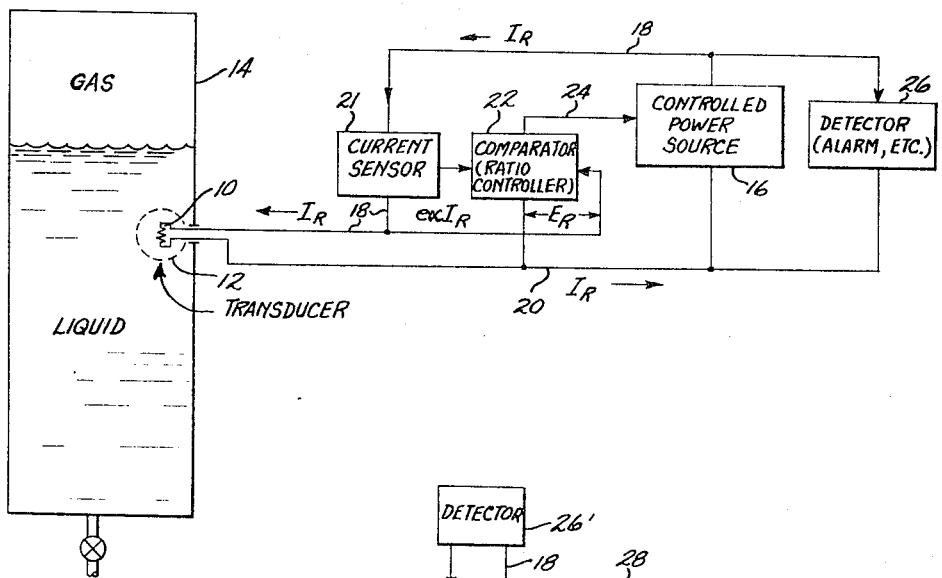
FIGURE 1 is a block diagram of one form of the invention applied to detect liquid level in a cryogenic liquid-gas container.

Referring to FIGURE 1, the temperature sensitive resistance element or transducer 10 is shown mounted in a protective shield 12 upon the inside wall of a cryogenic liquid container 14. The element 10, in this example, may be of any suitable electrically conductive material having a temperature-resistance coefficient (positive or negative, depending upon choice or specialized design requirements) sufficiently large to permit sensing a marked change of resistance with the change of heat transfer rate that occurs when the element is emersed from the liquid phase into the gaseous phase or is immersed into the liquid phase from the gaseous phase of the cryogenic within the container 14. Also, the material must be substantially inert to the cryogenic. In practice, the element 10 is made physically small and preferably in the form of a straight wire or a flat grid having a low inductance so that its reactance to change of current flow therein is negligible. It is made sufficiently small that it constitutes essentially a point level detector such that when the liquid reaches a particular level approaching the level of the sensor 10, any slight further change of level will substantially wholly emerse or wholly immerse the sensor, depending upon whether the level is dropping or rising in the container.

It will be recognized that the immersion of a heated resistance element in a cryogenic liquid draws heat from the element at a faster rate than when the element is exposed to the gaseous atmosphere above the surface of the liquid. If the element has a pronounced positive temperature coefficient of resistance, therefore, its resistance value, in the absence of supplemental heating, will be measurably less in the liquid than it is in the gas. As shown in FIGURE 1, heating current $I_R$ to the transducer element 10 is supplied from a controlled power source 16 through conductors 18 and 20 to establish the resistance of such element at the desired initial value or operating point. In practice it is preferred to design and normally heat the transducer to a temperature close to that of the liquid cryogenic in which it is immersed so as to require a minimum of heating energy.

Initial or normal heating curent $I_R$ flowing through transducer 10 is converted into a proportional voltage $e$ by the current sensor 21 interposed in conductor 18. This current is related to the voltage $E_R$ developed across the sensor in a ratio determined by the transducer resistance. Voltage $E_R$ is applied to one side of a differential amplifier or comparator 22, whereas the voltage $e$, proportional to $I_R$, is applied to the opposite side of the comparator. The function of the comparator basically is to detect a change of resistance of sensor 10 by detecting a change in the ratio of the sensor voltage to the sensor current. However, the ratio as such is not derived or sensed directly but instead one of the inputs to the comparator is amplified or reduced to such a value that it balances against the other input under initial or quiescent conditions and thereby produces a steady output (or zero response) in the comparator output as long as the sensor resistance remains constant. The comparator output 24 is applied to the control power source 16 and under these quiescent conditions establishes the desired initial operating point of the sensor. When the relationship between sensor current to sensor voltage changes, corresponding to a change of sensor temperature and thereby of its resistance, there will be a corresponding change in the comparator output 24, which will either increase or decrease the heating current applied to the temperature sensitive resistance 10 in a sense to compensate for the change. The feedback loop thus provided functions to maintain the resistance value of the sensor 10 constant throughout changes in level of liquid in the container 14.

A detector 26 connected to the controlled power source 16 senses changes in output of the latter and may be used to operate an indicator, an alarm or any other device as desired. The detector could be connected directly to the comparator 24 if desired or could be operated by the current sensor 21.

Figure 2:
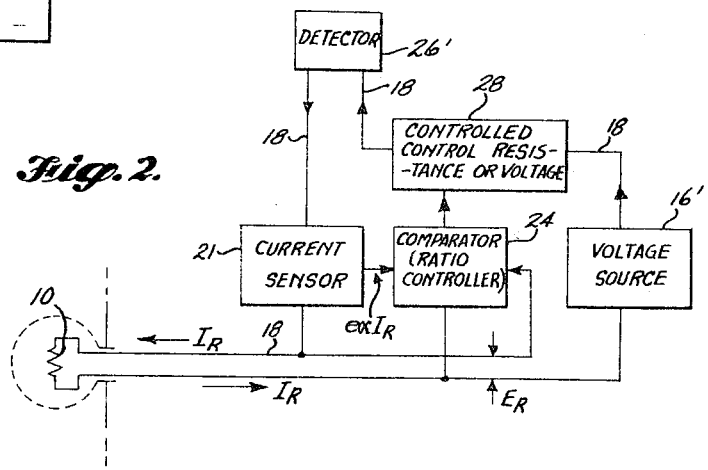
FIGURE 2 is a block diagram illustrating a modification of the invention.

In the modified system shown in FIGURE 2 output detector 26' is located in the conductor 18 carrying energizing current to the sensor 10. As in FIGURE 1, current sensor 21 derives a voltage $e$ proportional to the heating current $I_R$ and applies it to one side of the comparator, whereas sensor voltage $E_R$ is applied to the opposite side of the comparator. In this case a voltage-dropping resistance (or voltage source) 28 is interposed serially in the conductor 18 such that its output voltage adds to or subtracts from the voltage of the source 16'. The element 28 is under control of the comparator 24 and functions to provide compensating power increases or decraeses in accordance with the changes which occur in heat transfer rate of transducer 10 produced by its environment. Detector 26' functions to detect the change of heating current necessary to maintain the resistance value of transducer 10 essentially constant when the liquid level changes through a point established by the level of the transducer in tank 14.

Figure 3:
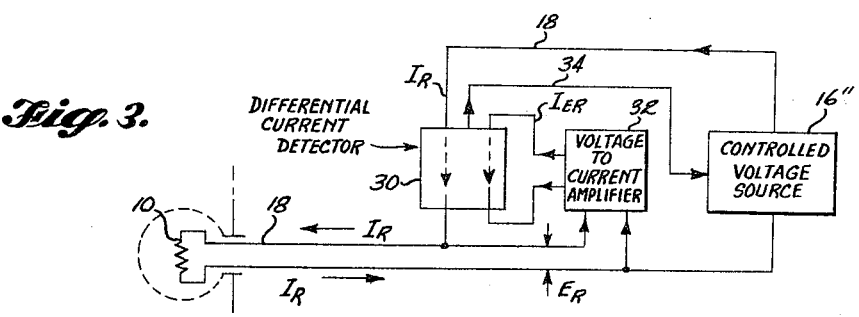
FIGURE 3 is a block diagram illustrating a second modification.

In the further modification shown in FIGURE 3, instead of comparing voltages (i.e., a voltage proportional to sensor current compared with sensor voltage), currents are compared. Thus, heating current $I_R$ is passed through one input channel of a differential current detector 30, whereas sensor voltage $E_R$ is converted into a current $I_{ER}$ by a voltage-to-current amplifier 32 and applied to the opposing channel of the differential current detector 30. The output 34 of detector 30 is supplied as a control voltage to the controlled voltage source 16" so as to vary the heating current $I_R$ in such manner as to regulate the ratio of heating current and voltage (i.e., the value of resistance) of the sensor 10 as desired.

Referring to FIGURE 4, sensing transducer 10, having a positive temperature-resistance coefficient, is connected serially with the collector of transistor $Q_1$, with resistor $R_1$ in the emitter lead. These components are connected serially between power supply positive and negative conductors $B_1$ and $B_2$. Transducer current is therefore controlled by the transistor $Q_1$ and passes through the emitter resistor $R_1$. As will appear, this emitter resistor functions as a shunt in an integral current measuring circuit which derives a voltage proportional to transducer current for comparison with transducer voltage in order to perform the follow-up feedback function of the network.

Transistor $Q_3$ is also connected, with its emitter resistor $R_4$ and its collector resistor $R_6$ between power supply conductors $B_1$ and $B_2$. A transistor $Q_2$ having its base connected to that of transistor $Q_3$ is connected to transistor $Q_1$ as a preliminary amplifier controlling the output of the latter as a current regulator for transducer 10. Voltage developed across resistor $R_1$ is added to the base-to-emitter voltages of transistor $Q_1$ and transistor $Q_2$ for application to the base of transistor $Q_3$, causing $Q_3$ to conduct. Amplification provided by interconnected transistors is such that the magnitude of current flow through emitter resistor $R_4$ is substantially proportional to that in resistor $R_1$, that is, the voltage drop across resistance $R_4$ is substantially proportional to current flow in transducer 10. Consequently, the collector current of transistor $Q_3$ is proportional to the collector current of transistor $Q_1$, which is the transducer current.

Collector current of transistor $Q_3$ flows through resistor $R_6$ and a silicon diode $CR_1$ in series therewith, and develops a voltage across these elements which is proportional to the transducer current. This voltage is applied to the base of comparator transistor $Q_4$. The latter has its collector connected to the common connection between the bases of transistors $Q_2$ and $Q_3$ and its emitter connected to the negative terminal $B_2$ of the power supply through resistor $R_{16}$, and to the collector of transistor $Q_1$. Thus, transistor $Q_4$ receives a base-to-emitter voltage which its proportional in polarity and magnitude to the difference between transducer voltage and transducer current. Collector current of transistor $Q_4$ drive the transistor $Q_3$ and also the combination of transistors $Q_1$ and $Q_2$ in accordance with the differential of the voltages applied to transistor $Q_4$, balancing the circuit. At balance, the drive voltage applied to transistor $Q_1$, after amplification in transistor $Q_2$, produces such supplemental heating current flow in the transducer 10 as to establish the transducer's temperature, and thereby its resistance, at the desired operating power compatible with the thermal environment of the transducer. A change of heat transfer rate to or from the transducer tends to change its temperature and thereby its resistance value. This, in turn, alters the relationship ($E/I$) of transducer current and voltage, which thereby unbalances the voltages applied to the base and emitter of transistor $Q_4$ and compensatively alters the drive applied to transistors $Q_1$ and $Q_2$ in order to restore the desired balance.

It will be recognized that the responsive feedback action of the circuit by which the ratio of transducer current and voltage is restored in response to any thermal disturbance affecting the transducer 10 is virtually instantaneous inasmuch as the sensitivity of the amplifying transistors is such as to require very little change of temperature in order to effect the desired follow-up action. Depending upon circuit threshold levels and sensitivity, detection of a critical change of liquid level or heat transfer rate can be effected at any desired point during the transition of the heating current for the transducer from its initial steady-state condition to its ultimate new steady-state condition required by the change. The fact that a voltage directly proportional to transducer current is compared with transducer voltage assures reliable accuracy in detecting a change of resistance value in the transducer.

Silicon diode $CR_1$ connected serially with resistor $R_6$ has a temperature-voltage characteristic which compensates for temperature effects on the voltage of the base-emitter junction of comparator transistor $Q_4$.

Figure 5:
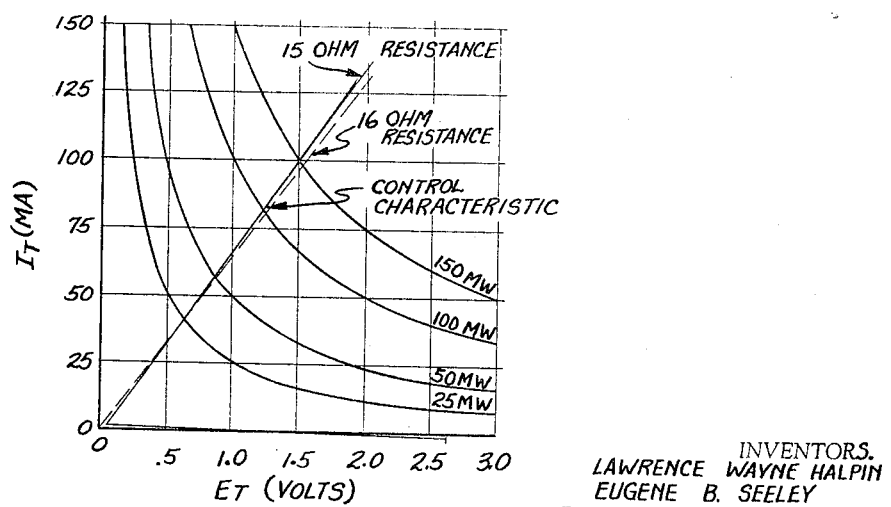

Referring to both FIGURES 4 and 5, it is found in practice that transistors of the production variety have junction voltage characteristics which, in the circuit shown in FIGURE 4, would cause the control characteristic of the circuit to intersect the current axis and not the voltage axis. However, with a transducer 10 of positive temperature-coefficient material, it is desired for stability in the operation of the control loop that the control characteristic of the circuit intersect the voltage axis, such that the circuit will apply increased heating power to the transducer in response to a decrease of transducer resistance and decreased power in response to an increase of transducer resistance. This result may be achieved by any of different circuit design expedients which, through appropriate bias, will shift the control characteristic along the scale of increasing voltage, so as to intersect the voltage axis at current zero. In the illustration such biasing is provided by supplementing the current flow through resistance $R_6$. To this end, the junction between transistor $Q_3$ and resistance $R_6$ is connected through a resistance $R_7$ to the positive supply conductor $B_1$.

Referring to FIGURE 5, it will be noted that in addition to the line representing the control characteristic of the circuit as thus far described, two other lines are also drawn, one representing a 15 ohm resistance and the other representing a 16 ohm resistance. These values are chosen to be representative of transducer resistance at cryogenic temperatures and are determined by appropriate choice of transducer material and dimensioning in relation to operating temperatures. In the illustration, the 15 ohm resistance line intersects the control characteristic at a value of approximately 100 milliamperes and at a voltage of 1.5. The 16 ohm resistance line intersects the control characteristic at approximately 28 milliamps and 0.45 volts. Thus, under thermal conditions stabilizing the resistance of the transducer at 15 ohms (in the liquid) the controller would supply 150 milliwatts to the transducer 10, whereas for stabilization at 16 ohms (in the gas) it would require only 12.6 milliwatts.

In order to detect initiation of a change from one resistance value to the other caused by a change of liquid level, voltage developed across resistance $R_1$ by transducer current is monitored by the zener diode $CR_3$ connected serially with the emitter base terminals of transistor $Q_5$, the latter's collector resistance $R_9$ and a resistance $R_{10}$, between the power supply leads $B_1$ and $B_2$. The base of transistor $Q_5$ is connected through resistance $R_{11}$ to the junction of resistance $R_1$ and the emitter of transistor $Q_1$. By appropriate selection of the value of resistance $R_1$ and the zener voltage of diode $CR_3$ current will flow through the base of transistor $Q_5$ when the transducer 10 is immersed in cryogenic liquid and will cease flowing when transducer current starts to decrease upon emersion of the transducer from the liquid, initiating a change of transducer resistance. Typically, an incremental change of 0.1 ohm is sufficient to cut off transistor $Q_5$. Prior to such a change, normal flow of base current in transistor $Q_5$ produces collector current flowing through resistance $R_9$ and the base of transistor $Q_6$, which base is connected to the junction between resistances $R_9$ and $R_{10}$. The collector of transistor $Q_6$ is connected to the junction of resistance $R_5$ and zener diode $CR_2$. The other end of resistor $R_5$ is connected to positive conductor $B_1$, and the other end of diode $CR_2$ is connected to negative conductor $B_1$. The emitter of transistor $Q_6$ is connected to the negative conductor $B_2$. Normal flow of base current in transistor $Q_6$ renders its collector-emitter path highly conductive so as to clamp the voltage across zener diode $CR_2$ substantially to zero. Under this condition the output delivered by conductor 18' is substantially zero, i.e. with the transducer immersed. When emersion occurs the clamp is removed and the zener voltage (e.g., 5 volts) is applied to output conductor 18' for operating any suitable device or indicator thereby. This clamp and standardized output voltage source arrangement provides a positive on-off output signal from the circuit.

Figure 6:
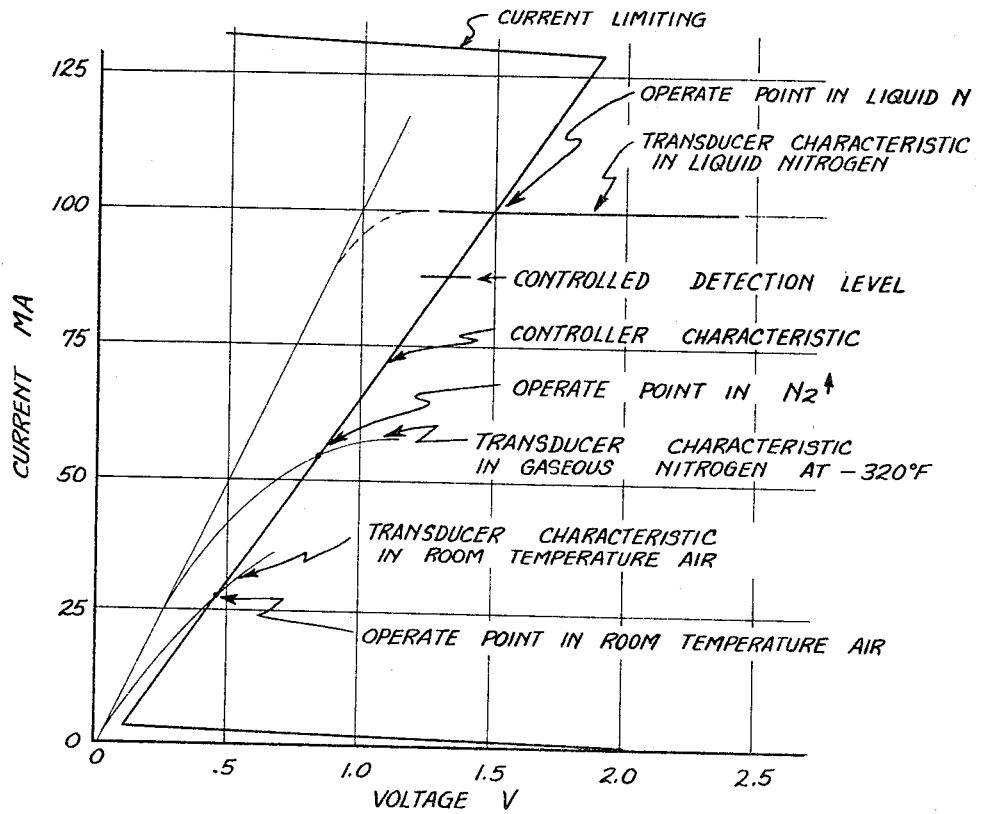
FIGURES 5 and 6 are graphic respresentations of typical control characteristics and sensing element characteristics.

FIGURE 6 illustrates a typical controller characteristic superimposed upon the transducer heat transfer characteristics in cryogenic liquid, cryogenic gas and in room temperature air. The operating points in the various fluids correspond to the intersections of the controller characteristic and the heat transfer curves.

In order to minimize the possible hazard of damage to the transducer 10 or of combustion in a flammable cryogenic due to excessive power dissipation in the transducer, means are incorporated in the circuit shown in FIGURE 4 to limit the power that may be applied to the transducer. A voltage divider comprising resistor $R_{12}$ connected serially with resistance $R_{13}$ between the positive supply conductor $B_1$ and the junction between resistance $R_1$ and the emitter of transistor $Q_1$ samples a given proportion, such as 60%, of the voltage drop across the sensing resistor $R_1$. The fractional voltage developed at the junction between resistors $R_{12}$ and $R_{13}$ causes flow of base current in a transistor $Q_7$, the latter having a collector connected to the negative supply conductor $B_2$ through resistor $R_{15}$, and having an emitter connected to the positive supply conductor $B_1$ through zener diode $CR_3$. The resulting collector current flowing in transistor $Q_7$ thus bypasses some of the current from transistor $Q_3$ in order to destroy the constant voltage-to-current ratio of the basic circuit for regulating resistance of transducer 10. In effect, the voltage divider limits the possible percentage of increase of transducer current above its normal value by the voltage division ratio of such voltage divider (i.e., 60%).

For a shorted transducer, the base of the comparator transistor $Q_4$ will be clamped to the negative supply conductor $B_2$ by transistor $Q_8$. The base of this transistor is connected to the collector of transistor $Q_7$, whereas its collector is connected to the base of transistor $Q_4$ and its emitter is connected to the negative supply conductor $B_2$. Thus, voltage of transducer 10 is clamped to zero when current tends to rise above the limiting value established by the voltage divider ratio of resistors $R_{12}$ and $R_{13}$ in relation to the voltage across zener diode $CR_3$, which determines the trip point of the circuit.

Resistor $R_{16}$ connected in parallel with the transducer 10 limits the voltage which can be developed across the transducer leads in the event the transducer for any reason becomes disconnected or otherwise forms an open circuit.

These and other aspects of the invention will be evident on the basis of the foregoing description of the presently preferred embodiments thereof and of the accompanying illustrations.

We claim as our invention:
1. Means for detecting change of heat transfer rate between a temperature sensitive resistance element and its thermal environment, comprising in combination with such an element, a controlled source of heating current, circuit means energizingly connecting said source to said element for establishing the resistance value thereof in said environment, detector means operatively connected with said circuit means for detecting change of resistance of said element from said value, said detector means including a first input responsive to heating current flow in said element, a second input responsive to voltage across said element, and an output responsive to a change in the relationship of said element's current and voltage and controllingly connected to said source for increasing or decreasing such heating current compensatively with changes of heat transfer rate induced by said environ- ment, and an output means connected for producing an output signal from a change of said heating current.

2. The means defined in claim 1, wherein the detector means comprises a normally balanced differential amplifier circuit in which the first input is balanced against the second input and wherein the output, controllingly connected to the source, responds to an increase or decrease of resistance element heating current relative to resistance element voltage.

3. The means defined in claim 2, wherein the source comprises a voltage source the output voltage of which is controllable substantially independently of output current.

4. The means defined in claim 2, wherein the source comprises a voltage source and a controlled voltage-dropping impedance means connected serially with said source and to which the detector means output is controllingly connected.

5. Means for detecting change of heat transfer rate between a temperature sensitive impedance element and its thermal environment, comprising in combination with such an element, a controlled source of heating power, circuit means energizingly connecting said source to said element for establishing the impedance value thereof in said environment, detector means operatively connected with said circuit means for detecting change of impedance of said element from said value, said detector means including a first input responsive to heating current flow to said element, a second input responsive to voltage across said element, and an output responsive to a change in the relationship of said element's current and voltage and controllingly connected to said source for increasing or decreasing such heating power compensatively with changes of heat transfer rate induced by said environment, and an output means connected for producing an output signal from a change of said heating power.

6. The means defined in claim 5, wherein the source comprises a voltage source and a controlled voltage-dropping impedance means connected serially with said source and to which the detector means output is controllingly connected.

7. A liquid level detector comprising a temperature sensitive resistance element, means to mount the element for immersion in and emersion from such a liquid as its level changes relative to the element, a controlled source of heating current, circuit means enerizingly connecting said source to said element for establishing the resistance value thereof with the liquid level offset in one sense from the element, detector means operatively connected with said circuit means for detecting change of resistance of said element from said value, said detector means including a first input responsive to heating current flow in said element, a second input responsive to voltage across said element, and an output responsive to a change in the relationship of said element's current and voltage and controllingly connected to said source for increasing or decreasing such heating current compensatively with changes of heat transfer rate induced by a change of liquid level between a level above said element and a level below said element, and an output means connected for producing an output signal from a change of said heating current.

8. The means defined in claim 7, wherein the detector means comprises a normally balanced differential amplifier circuit in which the first input is balanced against the second input and wherein the output, controllingly connected to the source, responds to an increase or decrease of resistance element heating current relative to resistance element voltage.

9. Means for maintaining resistance of a temperature sensitive resistance element in a variable thermal environment, comprising, in combination with such an element, a differential amplifier having an output and two opposing inputs, one such input being connected across the element and the other input having a first resistance therein, amplifier means having an output connected to the element for controlling heating current therein and having an input to which the differential amplifier output is connected, a second resistance connected in the load circuit of said amplifier means to develop a voltage proportional to such heating current, and additional amplifier means having an input connected to said second resistance to be subject to said voltage and having a load circuit including said first resistance to produce a voltage drop in the latter proportional to said voltage.

10. Means for detecting change of liquid level through a given point, comprising a temperature sensitive element mounted at said point, a differential amplifier having an output and two opposing inputs, one such input being connected across the element and the other input having a first resistance therein, amplifier means having an output connected to the element for controlling heating current therein and having an input to which the differential amplifier output is connected, a second resistance connected in the load circuit of said amplifier means to develop a voltage proportional to such heating current, and additional amplifier means having an input connected to said second resistance to be subject to said voltage and having a load circuit including said first resistance to produce a voltage drop in the latter proportional to said voltage.

References Cited by the Examiner
UNITED STATES PATENTS

| | | | |
|---|---|---|---|
| 2,769,076 | 10/1956 | Bogdan | 13—24 |
| 2,769,121 | 10/1956 | Rogoff | 340—244 |
| 3,031,610 | 4/1962 | Hamilton | 323—66 |

LOUIS R. PRINCE, *Primary Examiner.*

S. CLEMENT SWISHER, *Assistant Examiner.*